(12) United States Patent
Morris et al.

(10) Patent No.: US 9,915,310 B2
(45) Date of Patent: Mar. 13, 2018

(54) DISC BRAKE ASSEMBLY

(71) Applicant: Meritor Heavy Vehicle Braking Systems (UK) Limited, Cwmbran, Gwent (GB)

(72) Inventors: Mathew Morris, Gwent (GB); Vadiraj Pavaman, Gwent (GB); Norman Breakwell, Gwent (GB); Sanjeev Kulkarni, Gwent (GB); Sean Cleary, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days.

(21) Appl. No.: 15/209,280

(22) Filed: Jul. 13, 2016

(65) Prior Publication Data
US 2017/0023082 A1   Jan. 26, 2017

(30) Foreign Application Priority Data
Jul. 21, 2015  (EP) .................................... 15177728

(51) Int. Cl.
| F16D 66/02 | (2006.01) |
| F16D 55/226 | (2006.01) |
| F16D 65/00 | (2006.01) |
| F16D 55/00 | (2006.01) |
| F16D 55/2265 | (2006.01) |

(52) U.S. Cl.
CPC .......... *F16D 66/02* (2013.01); *F16D 55/226* (2013.01); *F16D 65/0068* (2013.01); *F16D 55/2265* (2013.01); *F16D 2055/002* (2013.01); *F16D 2055/0016* (2013.01)

(58) Field of Classification Search
CPC .... F16D 55/226; F16D 65/0056; F16D 66/02; F16D 66/022; F16D 2065/022
See application file for complete search history.

(56) References Cited

U.S. PATENT DOCUMENTS

| 4,356,897 A * | 11/1982 | Urban .................. F16D 55/224 |
| | | 188/1.11 W |
| 4,850,454 A * | 7/1989 | Korody ................ F16D 66/023 |
| | | 116/208 |
| 8,752,678 B2 * | 6/2014 | Gruber ................. F16D 66/025 |
| | | 116/208 |

(Continued)

FOREIGN PATENT DOCUMENTS

| EP | 1596092 A1 | 11/2005 |
| GB | 2458789 A | 10/2009 |

(Continued)

OTHER PUBLICATIONS

European Patent Office, Extended European Search Report for the corresponding European Patent Application No. 15177728.1 dated Jan. 20, 2016.

*Primary Examiner* — Bradley T King
(74) *Attorney, Agent, or Firm* — Brooks Kushman P.C.

(57) ABSTRACT

A disc brake assembly having a carrier having a first formation on an inboard surface thereof and a caliper slideably mounted to the carrier having a second formation that is proximate to the first formation in use. The relative positions of the first formation and the second formation may be indicative of an amount of wear of a brake friction element and/or a rotor.

18 Claims, 6 Drawing Sheets

(56) References Cited

U.S. PATENT DOCUMENTS

| | | | |
|---|---|---|---|
| 9,222,534 B2* | 12/2015 | Corcoran | F16D 55/225 |
| 9,511,755 B2* | 12/2016 | Seglo | B60T 17/22 |
| 2003/0084714 A1* | 5/2003 | Chang | G01L 5/28 |
| | | | 73/121 |
| 2007/0012525 A1* | 1/2007 | Nechvatal | F16D 66/02 |
| | | | 188/1.11 W |
| 2008/0067015 A1* | 3/2008 | Thomas | F16D 55/00 |
| | | | 188/73.31 |
| 2015/0184706 A1* | 7/2015 | Bull | F16D 65/095 |
| | | | 188/73.31 |
| 2016/0327111 A1* | 11/2016 | Huber | F16D 66/02 |

FOREIGN PATENT DOCUMENTS

| | | |
|---|---|---|
| JP | S5132387 U | 3/1976 |
| JP | S553072 U | 1/1980 |
| WO | 9906725 A2 | 2/1999 |

\* cited by examiner

DISC BRAKE ASSEMBLY

TECHNICAL FIELD

The present invention relates to a disc brake assembly, in particular an air actuated disc brake assembly.

BACKGROUND

Over time, with repeated braking operations, the friction elements, and to a lesser extent the brake rotor, of disc brakes will wear down and need to be replaced in order for the disc brake assembly to continue to provide adequate braking. Many air actuated disc brakes, for use on heavy vehicles, have an adjuster mechanism to set the position of the friction elements relative to the brake rotor to account for the wear of the friction material thereof, whilst maintaining a suitable running clearance to the rotor.

When the friction elements (commonly known as brake pads) are fully worn, these can be replaced with new thicker elements. If the friction elements are replaced too early when a substantial thickness of friction material remains, the operating costs of the vehicle are increased. Whereas, if replacement of the friction elements occurs too late, after the elements have become excessively worn and the friction material is no longer remaining, the resulting braking effect may be insufficient and/or may result in damage to the disc brake assembly.

Due to this, the operator needs to be able to monitor the amount of wear that has occurred to the friction elements. Typically, a visual wear indicator is provided on the disc brake assembly to enable the operator to visually check the wear of the elements. In some installations, air actuated disc brakes are fitted with electrical continuous wear sensors which monitor the wear of the friction elements. However, a visual indicator is still desirable in such systems.

Typically, the visual wear indicator is provided in the form a spring loaded pin which extends through, and protrudes from an inboard face of the caliper and abuts an inboard face of the brake carrier. As the friction elements are worn down, the pin moves outboard and the amount protruding from the caliper reduces.

Such systems require machining of the caliper so as to accommodate the pin, and also require these additional pin and spring components, adding to expense. Furthermore, depending upon the particular brake installation, the pin may be difficult to view with a wheel fitted to the brake. This makes visual inspection of the wear inconvenient.

The present invention seeks to overcome or at least mitigate some or all of the problems associated with the prior art.

SUMMARY

A first aspect of the invention provides a disc brake assembly, comprising a carrier having a first formation on an inboard surface thereof, the first formation having a predetermined shape, a caliper slideably mounted to the carrier having a second formation that is proximate to the first formation in use, the second formation having a predetermined shape, wherein the relative positions of the first formation and the second formation are indicative of an amount of wear of a brake friction element and/or a rotor of the assembly in use.

Providing the first formation on an inboard surface means that it may be easier for it to be seen when in a typical installation within a wheel rim of a wheel.

The carrier may comprise a mount for mounting the carrier to a vehicle, and wherein the first location formation is inboard of the mount. Being inboard of the mount may further enhance the visibility of the formation.

The mount may comprise a bore which is suitable for radially mounting the carrier to a vehicle.

The mount may comprise a bore extending through the carrier in a direction tangential to a circle described by rotation of a rotor of the disc brake.

The first formation may protrude from the carrier. This may further enhance the visibility of the first formation.

The first formation may protrude at least in an inboard direction. This may further enhance the visibility of the first formation.

The first formation may protrude at least in a direction towards the second formation. This may further enhance the visibility of the first formation and may aid comparison of the relative positions of the first and second formations.

The second formation optionally protrudes from the caliper. This may enhance the visibility of the second formation.

The second formation optionally protrudes towards the carrier. This may further enhance the visibility of the second formation and may aid comparison of the relative positions of the first and second formations.

The first formation may be an integral component of the carrier. Preferably, the first formation and the carrier are formed as a single component. More preferably, the first formation is integrally cast with the carrier. By providing as an integral component, no further components or manufacturing operations may be needed.

The second formation may be an integral component of the carrier. Preferably, the first formation and the carrier are a single component. More preferably, the second formation is integrally cast with the caliper. By providing as an integral component, no further components or manufacturing operations may be needed.

The first formation may comprise a first planar inboard surface and the second formation may comprise a second planar inboard surface. This arrangement may make judging the degree of wear easier.

In one embodiment, the first formation may be inboard of the tangential bore.

In one embodiment, the first formation may protrude at least in a direction towards the second formation.

In one embodiment, the first formation and/or second formation may be substantially cuboid in shape.

The disc brake assembly optionally further comprises a friction element.

The caliper and carrier are optionally arranged such that when the friction element is fully worn, the inboard surface of the first formation is substantially co-planar with the inboard surface of the second formation. As the fully worn state of the friction element is the most important state to be aware of, arranging the first and second formations in this way means this is the easiest state of wear to discern.

The caliper and carrier are optionally arranged such that when the first brake friction element is excessively worn the second inboard surface is inboard with respect to the first inboard surface.

The first formation and the second formation may comprise planar surfaces which are substantially opposing when the friction element is fully worn. This arrangement may make judging the degree of wear easier.

According to a second aspect of the invention there is provided a method of manufacturing a disc brake, the method comprising the steps of manufacturing a carrier having a first formation on an inboard surface thereof, wherein the first formation has a predetermined shape and is integrally formed with the carrier, manufacturing a caliper having a second formation, wherein the second formation has a predetermined shape and is integrally formed with the caliper, and slideably mounting the caliper to the carrier such that the second formation is located proximate the first formation, such that the relative positions of the first formation and the second formation are indicative of an amount of wear of a brake friction element and/or a rotor of the assembly in use.

In one embodiment, the first formation and/or second formation may be integrally cast with the carrier or caliper, respectively.

The carrier may comprise a mount for mounting the carrier to a vehicle, and wherein the first location formation is inboard of the mount. Being inboard of the mount may further enhance the visibility of the formation.

The mount may comprise a bore which is suitable for radially mounting the carrier to a vehicle.

The mount may comprise a bore extending through the carrier in a direction tangential to a circle described by rotation of a rotor of the disc brake.

The first formation may protrude from the carrier. This may further enhance the visibility of the first formation.

The first formation may protrude at least in an inboard direction. This may further enhance the visibility of the first formation.

The first formation may protrude at least in a direction towards the second formation. This may further enhance the visibility of the first formation and may aid comparison of the relative positions of the first and second formations.

The second formation optionally protrudes from the caliper. This may enhance the visibility of the second formation.

The second formation optionally protrudes towards the carrier. This may further enhance the visibility of the second formation and may aid comparison of the relative positions of the first and second formations.

The first formation may comprise a first planar inboard surface and the second formation may comprise a second planar inboard surface. This arrangement may make judging the degree of wear easier.

BRIEF DESCRIPTION OF THE DRAWINGS

Embodiments of the invention will now be described with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
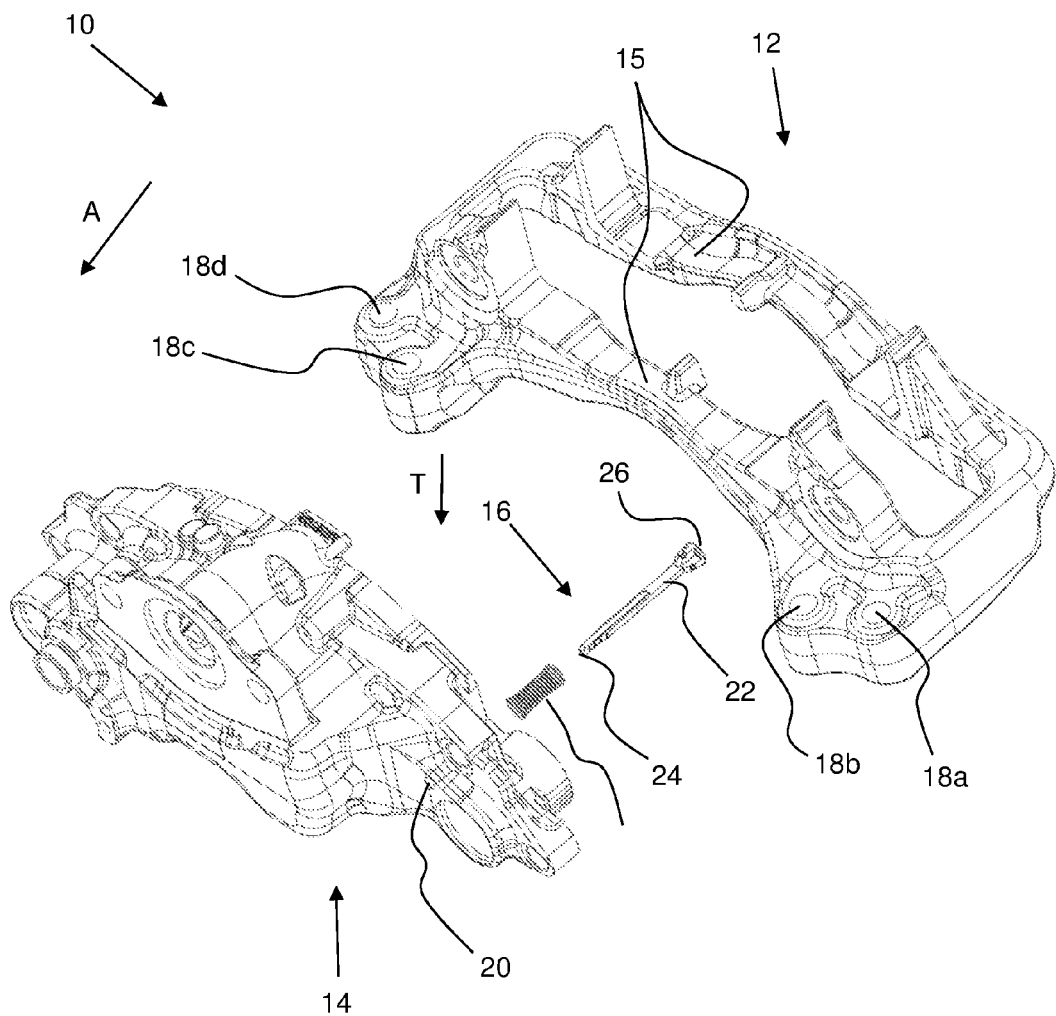
FIG. 1 is an exploded isometric view of a disc brake of the prior art.
Figure 2:
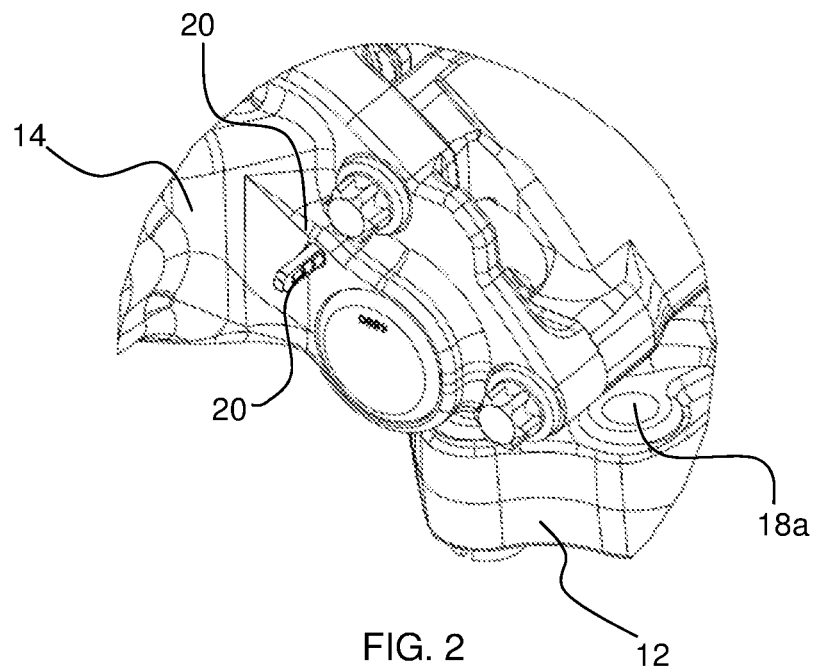
FIG. 2 is an enlarged isometric view of the visual wear indicator of the disc brake of FIG. 1 in an unworn friction element position.
Figure 3:
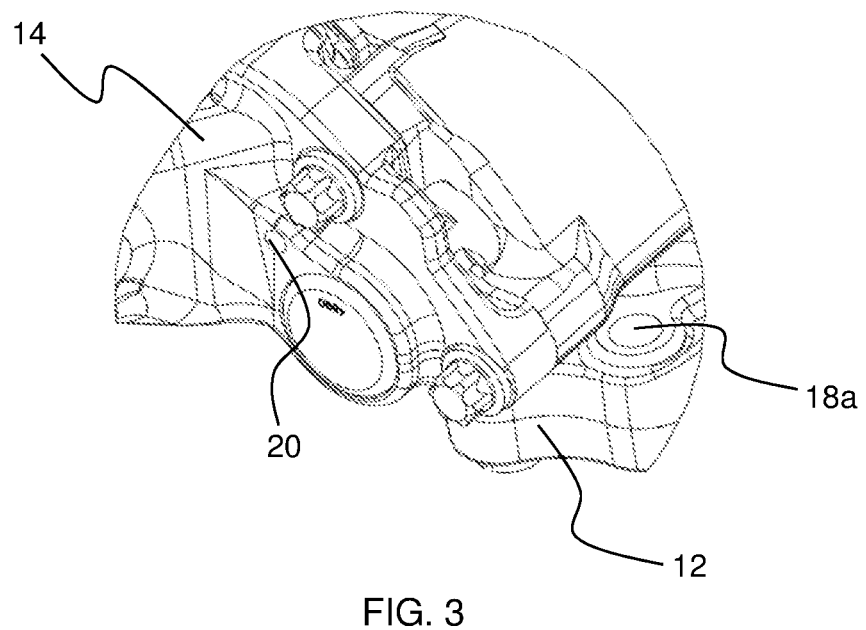
FIG. 3 is an enlarged isometric view of the visual wear indicator of the disc brake of FIG. 1 in a fully worn friction element position.

Exemplary components of an air actuated disc brake of the prior art are illustrated in FIGS. 1 to 3. The disc brake assembly is indicated generally at 10. A carrier 12, a caliper housing 14 and a visual wear indicator 16 of the assembly 10 are illustrated in an exploded view in FIG. 1.

The caliper housing 14 is provided with a bore 20 which extends through the caliper housing 14 in a direction A, where direction A, shown by arrows in FIG. 1, is a direction parallel to an axis of rotation of a rotor of the disc brake and is substantially perpendicular to a plane substantially parallel to a planar face of the rotor.

The known visual wear indicator 16 is separate to the carrier 12 and the caliper housing 14 and is in the form of a spring 24 concentrically arranged around an elongate pin 22 which is inserted into the bore 20. The elongate pin 22 has a head 26 at a first end which is configured and positioned so as to abut against a surface of the carrier 12 in use. The spring 24 of the visual wear indicator works to bias the pin 22 against the surface of the carrier 12. The elongate pin 22 also includes a second longitudinal end 28 which is configured and positioned to be able to protrude from the bore 20 from an inboard surface of the caliper housing 14.

The carrier 12 comprises recesses 15 to receive an inboard and an outboard friction element and which are configured to restrain the friction elements therein both circumferentially and radially inwardly. Four bores 18a, 18b, 18c, 18d are formed in the carrier 12, each configured for receiving a bolt therethrough to attach the carrier to a mount. Two of the bores 18a, 18b are positioned at one side of the carrier 12 of the disc brake assembly 10 and the other two bores 18c, 18d are spaced from the two bores 18a, 18b and are positioned at an opposite side of the carrier 12 of the disc brake assembly 10 (i.e., an opposite side of an axle when the mount is attached thereto). Two inner bores 18b, 18c are provided closer to the longitudinal center of the carrier 12 (i.e., closer to the axle when the mount is attached thereto), with two outer bores 18a, 18d positioned proximate the longitudinal ends of the carrier (i.e., farther from the axle when the mount is attached thereto). The bores 18a, 18b, 18c, 18d extend through the carrier 12 in a direction T. In this embodiment, the bores 18a, 18b, 18c, 18d extend entirely through the carrier 12. The direction T, shown by arrows in FIG. 1, is defined in terms of a rotor of the disc brake assembly and is a direction tangential to a circle described by rotation of a rotor of a disc brake and generally parallel or aligned with a direction of insertion or removal of a friction element into or from the carrier.

Operation of such disc brakes is well known and is described in more detail in, for example, WO9906725. Briefly, in order to apply the brake, a force is applied to move an inboard friction element via one or more pistons towards a brake disc. Once the inboard friction element has contacted the rotor an outboard friction element is then caused to move towards an opposite face of the rotor due to a reaction force transmitted through the caliper. Through repeated application of the disc brake, adjustment is required to account for wearing of the friction material of the friction elements and the rotor. An adjuster system is provided so as to adjust the friction elements with respect to the rotor and therefore alter the position of the caliper housing 14 with respect to the carrier 12 to account for such wear.

In use, the pin 22 of the visual wear indicator 16 is configured to abut against a surface of the carrier 12 when the caliper housing 14 is slideably mounted to the carrier. When an unworn friction element is located in the disc brake assembly 10, the pin 22 is configured to protrude from an inboard surface of the caliper housing 14, as is illustrated in FIG. 2. As the friction elements wear and the caliper housing 14 moves inboard with respect to the carrier 12. This movement results in the length of the pin 22 protruding from the bore 20 being reduced. This process continues until, when the friction element is fully worn, the pin 22 no longer protrudes from the bore 20, as is illustrated in FIG. 3. At this point the operator will be able to visually confirm that replacement of the friction elements is required.

Referring now to FIGS. 4 to 9, a disc brake assembly according to an embodiment of the present invention is indicated generally at 110 and comprises a carrier 112 and a caliper housing 114. The disc brake assembly 110 and its operation to apply the friction elements to the rotor and adjust for wear of the friction elements and the rotor is similar to that of the disc brake of FIGS. 1 to 3. Corresponding components of the figures are labelled with the prefix '1' with respect to FIGS. 1 to 3 and only differences are discussed.

In this embodiment, in place of the pin 22 the carrier 112 is provided with a first formation 130 located on the same side of the carrier 112 as the bores 118a, 118b. In this embodiment, the first formation 130 is provided on an inboard surface of the carrier 112 having a predetermined shape. In the illustrated embodiment, the predetermined shape is substantially cuboid. The first formation 130 protrudes from the surface of the carrier 112. The first formation 130 has a first surface 134 which is substantially planar and is parallel to the plane of the inboard direction A. The first formation 130 extends in a direction perpendicular to the inboard direction A towards the caliper housing 114. Surface 134 is the leading edge of this extension. The first formation 130 has a second surface 136 which is substantially planar and is parallel with the plane of the rotor of the disc brake assembly 110. The first formation 130 is provided proximate the outer bore 118a and is located inboard with respect to the bore 118a. In alternative embodiments, the first formation 130 may be provided proximate to the inner bore 118b.

Figure 4:
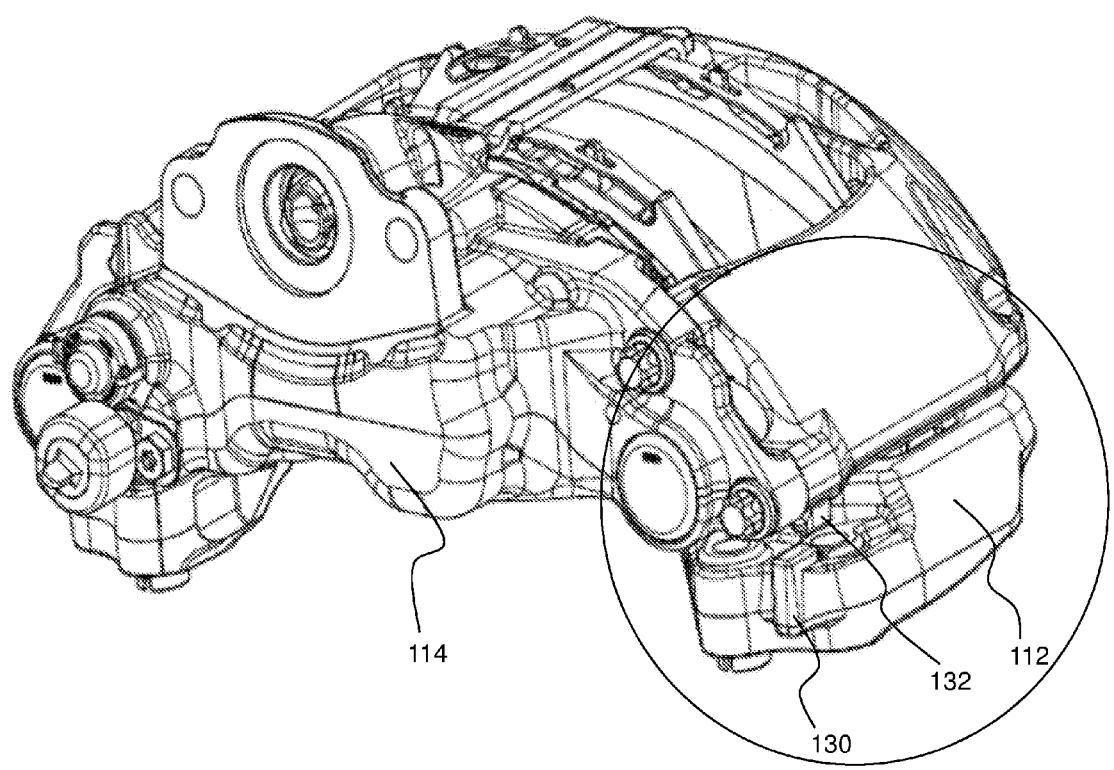
FIG. 4 is an isometric view of a disc brake according to an embodiment of the present invention.

In this embodiment, the caliper housing 114 is provided with a second formation 132 located on the same side of the caliper housing 114 (in use) as the bores 118a, 118b of the carrier 112. The second formation 132 is located proximate to the first formation 130 when the disc brake assembly has been assembled, as is illustrated in FIG. 4. The second formation 132 is provided having a predetermined shape. In the illustrated embodiment, the predetermined shape is substantially cuboid, but it will be appreciated that any suitable shape may be used. The second formation 132 is provided on a surface which opposes the first formation 130 when the disc brake assembly 110 is assembled. The second formation 132 protrudes from the caliper housing 114 and, in this embodiment, protrudes towards the first formation 130 of the carrier 112.

The second formation 132 has a first surface 140 which is substantially planar and is parallel to the plane of the inboard direction A. The second formation 132 extends in a direction perpendicular to the inboard direction A towards the carrier 112, where the surface 140 is the leading edge of this extension. The surfaces 134, 140 are substantially parallel with respect to each other and are configured to oppose each other in use. The second formation 132 has a second surface 138 which is substantially planar and is parallel with the plane of the rotor of the disc brake assembly 110. The second formation 132 extends in a substantially inboard direction. The surface 138 is the leading edge of this extension.

Figure 5:
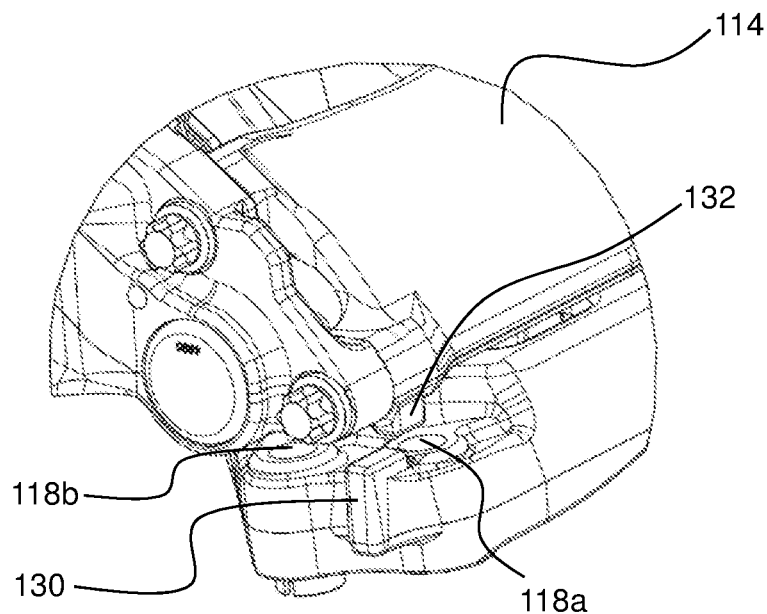
FIG. 5 is an enlarged isometric view of the visual wear indicator of the disc brake of FIG. 4 in an unworn friction element position.
Figure 6:
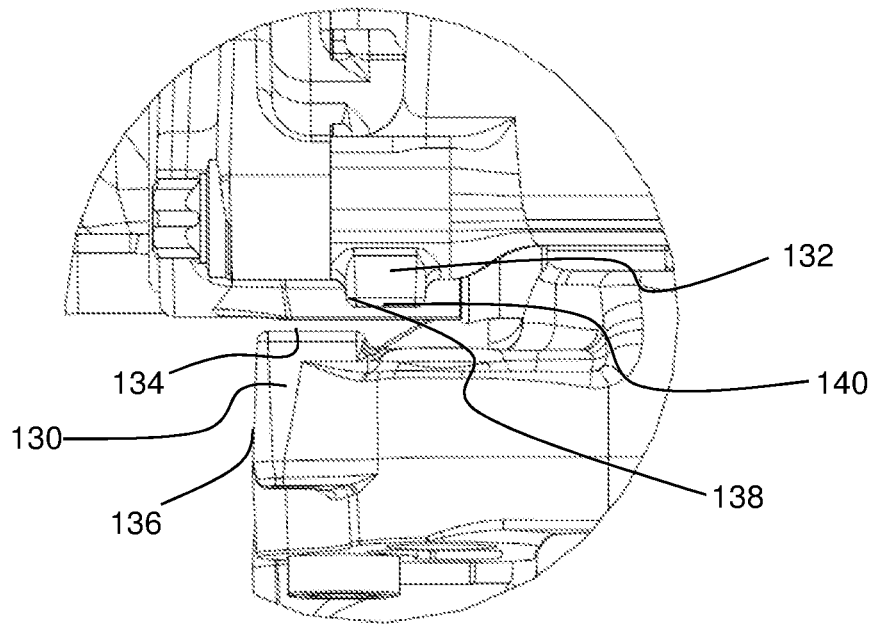
FIG. 6 is an enlarged side view of the visual wear indicator of the disc brake of FIG. 4 in an unworn friction element position.
Figure 7:
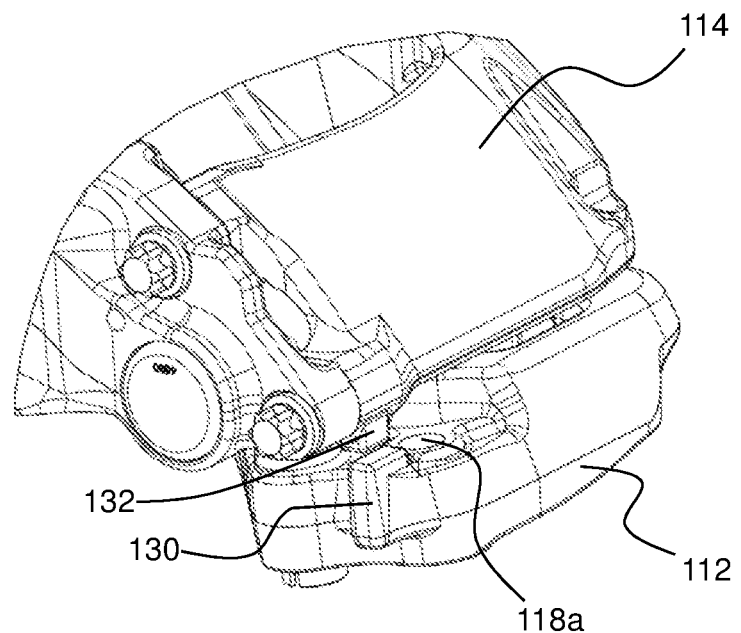
FIG. 7 is an enlarged isometric view of the visual wear indicator of the disc brake of FIG. 4 in a fully worn friction element position.
Figure 8:
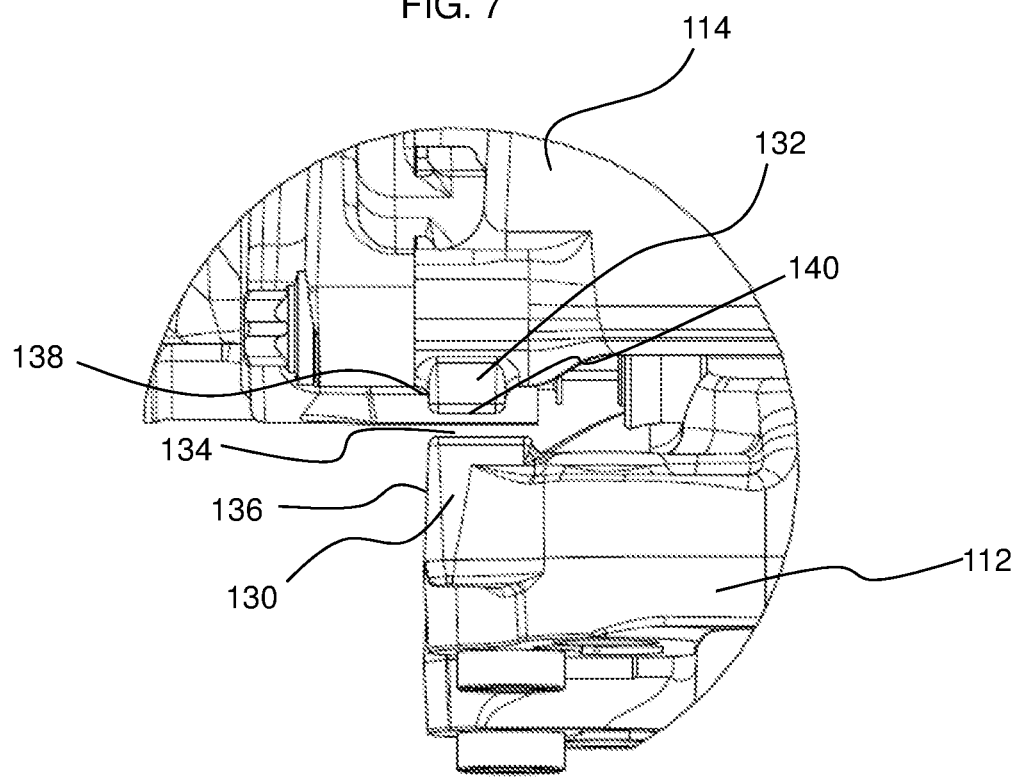
FIG. 8 is an enlarged side view of the visual wear indicator of the disc brake of FIG. 4 in a fully worn friction element position.

The relative position of the surface 136 of the first formation 130 and the surface 138 of the second formation 132 is indicative of the wear of the friction elements and/or the wear of the rotor of the assembly in use. When the friction element is fully worn, the surface 136 of the first formation 130 is substantially aligned (i.e., co-planar) as can be seen in FIGS. 7 and 8. When the friction element is excessively worn the surface 140 of the second formation 132 is inboard with respect to the surface 136 of the first formation 130. When the friction element is unworn or partly worn the surface 138 of the second formation 132 is outboard with respect to the surface 136 of the first formation 130, as is illustrated in FIGS. 5 and 6.

In the illustrated embodiment, the carrier 112 and the caliper housing 114 are both cast components and the first formation 130 and the second formation 132 are integral with the carrier 112 and caliper housing 114, respectively. That is, the first formation 130 and second formation 132 are integrally cast with the carrier 112 and caliper housing 114, respectively. It will be understood that being integrally formed means being formed as a single component, and does not cover arrangements where the formations are made separately and then permanently or temporarily attached the carrier or caliper, as such, no additional components or machining operations are needed. In alternative embodiments, only one of the first 130 or second 132 formations may be integrally cast with the carrier 112 or caliper housing 114 respectively. Alternatively, the first and second formations may be manufactured separately and secured to the carrier 112 and caliper housing 114 respectively.

The first formation 130 and second formation 132 have been described as being positioned on the carrier 112 and caliper housing 114 at locations proximate the bores 118a, 118b. However, it will be appreciated that the first formation 130 and second formation 132 could alternatively be positioned on the opposing side of the carrier 112 and caliper housing 114.

Further, it is noted that in this embodiment that caliper is formed from two main structural parts; a bridge part 114a extending over the carrier and a housing part 114b that contains the actuating and adjustment components within (not visible). Both parts are cast and are bolted together by bolts 119 and contact each other at complementary planar machined mating faces 117 immediately inboard of the second formation 132 on the caliper.

In alternative embodiments the inboard face of the second formation 132 is coplanar with the mating face 117 of the bridge 114a and may be machined in the same operation as the machining of the mating face 117.

Figure 9:
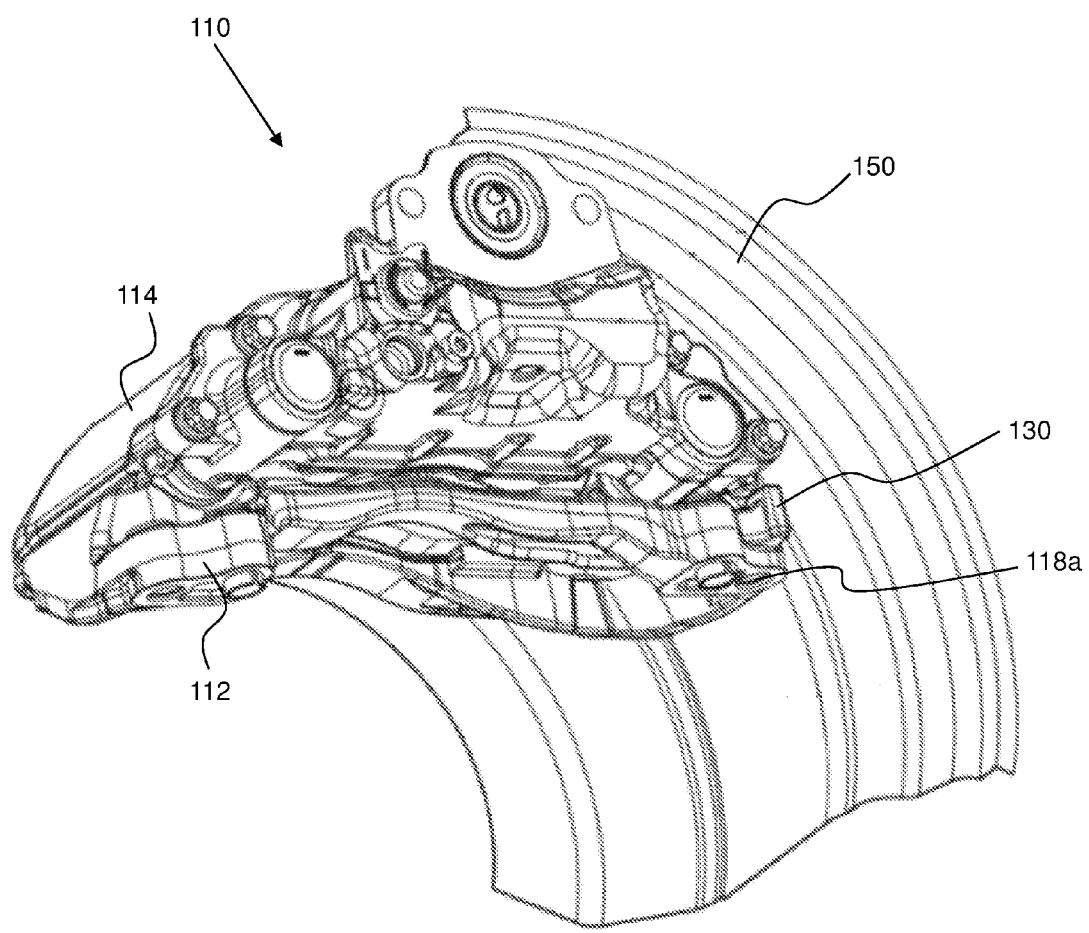
FIG. 9 is an isometric view of the disc brake of FIG. 4 with a wheel fitted thereto.

Referring to FIG. 9, the disc brake assembly 110 is illustrated in relation to a wheel rim 150 of a wheel attached thereto. Provision of the first formation 130 inboard of the bore 118a, proximate the lateral outer edge of the carrier and also extending inboard, along with provision of the second formation proximate a lateral outer edge of the caliper enables a greater ease of inspection of the visual wear indicator when viewed by the operator. This is due to there being no intervening component of the assembly being present between the operator and the visual wear indicator. This visibility would be further enhanced for the operator when viewing along a plane that is co-planar with the face of the rotor, as the first formation would be distinctly extending away from the other components of the assembly.

Additionally, the ease of inspection of the visual wear indicator by an operator is further improved by the location of the first and second formations when in relation to the torque plate for attaching the carrier to the vehicle due to the configuration of the bores 118a, 118b, 118c, 118d—i.e., the mounting to a torque plate on an axle or steering knuckle being of the tangential or radial type, rather than axial. This is because the view of the operator would not be obscured by the combination of the torque plate and the wheel rim when the vehicle wheel end is fully assembled.

Although not illustrated, each friction element has a friction material fixed thereto using a suitable mechanical keying arrangement. The friction material typically has a thickness of around 15-25 mm initially, and the friction element is typically considered fully worn and in need of replacement once 2 mm of material remains (although this minimum threshold cannot always be guaranteed to be followed in the field).

It will be appreciated that the dimensions referred to above are used for illustrative purposes, and will vary dependent upon the size and geometry of the brake to which the present invention is applied. The term "fully worn friction element" is intended to refer to a friction element which has reached its minimum design limit for the amount of friction material remaining thereon—i.e., in the specific embodiment above, 2 mm of friction material. The term "excessively worn friction element" is intended to mean a friction element that has less than the minimum design limit of friction material remaining—e.g., 1 mm or 0.5 mm.

Although the position of the formation is determined by wear of the outboard friction element and the outboard face of the rotor only, both friction elements are replaced as a set and wear at the same rate, so the visual wear indicator can be thought to be an indicator of the wear of both the inboard and the outboard element.

Although the invention has been described above with reference to one or more preferred embodiments, it will be appreciated that various changes or modifications may be made without departing from the scope of the invention as defined in the appended claims. In the illustrated embodiment, the first and second formations are substantially cuboid in shape but it will be appreciated that any suitable shape may be used for first, second or both formations such as (part) cylindrical, trapezoidal or triangular prism shapes, cube or any other suitable shape.

In alternative embodiments, the first formation or the second formation may comprise a series of markings to enable the operator to determine the amount of the wear of the friction elements.

In alternative embodiments the formation may extend further inboard than as shown in the embodiment above, i.e., extending further inboard than a plane defined by the inboard extent of the material surrounding the bore 118b.

In alternative embodiments, the caliper formation may be cast into the housing rather than the bridge. In other embodiments the housing and the bridge may be formed as a single casting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake assembly comprising:
a carrier having a mount for mounting the carrier to a vehicle and a first formation formed on an inboard surface of the carrier, the first formation being integral to the carrier; and
a caliper slideably mounted to the carrier having a second formation that is proximate to the first formation in use, the second formation being integral to the caliper, wherein the second formation is provided on a surface of the caliper that opposes the inboard surface that the first formation is provided on;
wherein relative positions of the first formation and the second formation are indicative of an amount of wear of a brake friction element and/or a rotor of the disc brake assembly in use; and
wherein the first formation is located inboard of the mount and the mount has a bore that extends through the carrier in a direction tangential to a circle described by rotation of the rotor, wherein the bore is configured to accept a radially extending bolt to radially mount the carrier to the vehicle.

2. The disc brake assembly of claim 1 wherein the first formation is inboard of the bore.

3. The disc brake assembly of claim 1 wherein the first formation protrudes from the carrier.

4. The disc brake assembly of claim 3 wherein the first formation protrudes at least in an inboard direction.

5. The disc brake assembly of claim 3 wherein the first formation protrudes at least in a direction towards the second formation.

6. The disc brake assembly of claim 1 wherein the second formation protrudes from the caliper.

7. The disc brake assembly of claim 6 wherein the second formation protrudes towards the carrier.

8. The disc brake assembly of claim 1 wherein the first formation is integral with the carrier.

9. The disc brake assembly of claim 1 further comprising a friction element.

10. The disc brake assembly of claim 9 wherein the caliper and carrier are arranged such that when the friction element is fully worn, the inboard surface of the first formation is substantially co-planar with an inboard surface of the second formation.

11. The disc brake assembly of claim 10 wherein the caliper and carrier are arranged such that when the friction element is excessively worn the inboard surface of the second formation is inboard with respect to the inboard surface of the first formation.

12. The disc brake assembly of claim 9 wherein the first formation and the second formation further comprise planar surfaces that are substantially opposing when the friction element is fully worn.

13. The disc brake assembly of claim 1 wherein the first formation and/or second formation are substantially cuboid in shape.

14. The disc brake assembly of claim 1 wherein the first formation is disposed adjacent to an outer bore that extends through the carrier and disposed adjacent to an inner bore that extends through the carrier.

15. The disc brake assembly of claim 14 wherein the second formation is partially disposed above the outer bore when in an unworn friction element position.

16. The disc brake assembly of claim 1 wherein the mount further comprises a radially extending bolt, the bolt being received in the bore to radially mount the carrier to the vehicle.

17. A method of manufacturing a disc brake, the method comprising the steps of:
   manufacturing a carrier that has a mount for mounting the carrier to a vehicle and a first formation on an inboard surface of the carrier, wherein the first formation is integrally formed with the carrier;
   manufacturing a caliper having a second formation, wherein the second formation is integrally formed with the caliper, wherein the second formation is provided on a surface that opposes the inboard surface and the first formation and the second formation protrudes toward one another;
   slideably mounting the caliper to the carrier such that the second formation is located proximate the first formation, such that relative positions of the first formation and the second formation are indicative of an amount of wear of a brake friction element and/or a rotor of the disc brake in use, wherein the first formation is located inboard of the mount and the mount has a bore that extends through the carrier in a direction tangential to a circle described by rotation of the rotor; and
   inserting a radially extending bolt into the bore to radially mount the carrier to the vehicle.

18. The method of claim 17 wherein the first formation and/or second formation are integrally cast with the carrier or the caliper, respectively.

* * * * *